United States Patent [19]

Kidder et al.

[11] Patent Number: 5,090,791
[45] Date of Patent: Feb. 25, 1992

[54] SELF-ILLUMINATED FIBRE OPTIC SWITCH

[75] Inventors: John S. Kidder, 2609 West 10th Ave., Vancouver, B.C., Canada, V6K 2J8; Derek Montgomery, Vancouver, Canada

[73] Assignee: John S. Kidder, Vancouver, Canada

[21] Appl. No.: 403,373

[22] Filed: Sep. 6, 1989

[51] Int. Cl.⁵ ............................ G02B 6/26; G02B 6/32; H01J 5/16
[52] U.S. Cl. ............................... 385/18; 385/22; 385/33; 385/36; 250/227.11; 250/227.22
[58] Field of Search ............... 350/96.10, 96.15, 96.16, 350/96.18, 96.19, 96.20, 96.21, 96.22; 250/227.11, 227.22

[56] References Cited

U.S. PATENT DOCUMENTS

| | | | |
|---|---|---|---|
| 3,999,074 | 12/1976 | Callaghan | 250/227.11 X |
| 4,315,147 | 2/1982 | Harmer | 250/227.22 X |
| 4,378,144 | 3/1983 | Duck et al. | 350/96.18 |
| 4,704,656 | 11/1987 | Neiger | 350/486 |
| 4,726,646 | 2/1988 | Tanaka et al. | 350/96.20 |
| 4,789,215 | 12/1988 | Anderson et al. | 350/96.19 |

FOREIGN PATENT DOCUMENTS

| | | | |
|---|---|---|---|
| 3439905 | 4/1986 | Fed. Rep. of Germany | 350/96.10 |
| 57-139704 | 8/1982 | Japan | 350/96.18 X |

*Primary Examiner*—Brian Healy
*Attorney, Agent, or Firm*—Shlesinger, Arkwright & Garvey

[57] ABSTRACT

A fibre optic switch for controlling the electrical power to a load or for logical applications is disclosed in which the switch has a secondary guided light beam to provide status indicator light. The moulded plastic components of the switch are used to provide the means for light transmission and control.

23 Claims, 7 Drawing Sheets

SELF-ILLUMINATED FIBRE OPTIC SWITCH

FIELD OF THE INVENTION

This invention relates to the field of switches for electrical controls, and more particularly to switches which operate through fibre optic or light guided systems.

BACKGROUND OF THE INVENTION

In certain applications, such as airplane cockpits, illuminated indicators are required for electrical switches to allow the operator to determine whether the switch is in an "on" or "off" state. Conventional switches have used incandescent lamps to provide such indicator lights. In large numbers, however, such incandescent lights produce a large quantity of heat which is inefficient an potentially unsafe in closed environments such as airplanes.

In the past it has been known to use fibre optic controls to control the functioning of electrical devices to provide a safer system for use in wet, hospital, explosive or other hazardous environments. For example see U.S. Pat. No. 3,999,074 which describes a fibre optic electric power control device, and U.S. Pat. No. 4,704,656 which discloses a fibre optic switch for controlling a wall receptacle. Such devices use the fibre optic switch to provide a light signal to a photo-electric device which in turn controls the electrical circuit. In this way the fibre optic control can be made remote from the electrical circuit. To date, however, none of these devices have provided fibre optic indicator illumination. Further, such devices have not incorporated the light guide into the casing of the unit itself for ease of manufacturing. Finally, none of the known prior devices have utilized a simple mechanical actuator to switch the light into and away from an output optical path.

The invention as claimed is intended to remedy these problems. It provides light director in a mechanical actuator to direct light into or away from an output optical path depending on the position of the actuator. Coupling between an optical input and output path or paths are provided by a fibre optic or lightguided control system incorporated at least partly in a mechanical actuator. The switched light is used to control electrical circuits and to control the incidence of switched light onto a light indicator. According to the invention there is provided a switch for switching a beam of light which includes a housing, an actuator reversibly moveable with respect to said housing between a first and second position, an input optical path, a first output optical path, and a light redirecting means. The light redirecting means directs light from the input path to the first output path and includes a prism positioned on the actuator which is movable to and from a first position in a direction such that reflecting faces the prism are tangent to its direction of movement. The prism directs light from the input path to the first output path when the actuator is in the first position.

The switch may include a second optical output path. The light redirecting means includes a pair of prisms positioned on the actuator and movable from a first reflecting position to a second reflecting position such that the prisms move in a direction in which their reflecting surfaces are tangent to the direction of movement. A first output prism of the pair of prisms when in the first reflecting position is positioned to reflect light from the input path to the first output path and a second output prism of the pair of prisms when in the second reflecting position is positioned to reflect light from the input path to the second output path.

The switch may also include an actuator having a prism and a plurality of optical output paths with the prism rotatable so as to direct light from the input optical path to each of the output optical paths depending on the position of the actuator.

One or more indicators which become illuminated in response to incident light may be employed to indicate switch position. The housing of the actuator may be transparent so as to obviate the need for light transmitting lines such as light guides or fibres to be installed in the actuator.

The advantages of the invention over conventional electrical control systems are less complexity, greater reliability, reduced heat generation and lower costs.

BRIEF DESCRIPTION OF THE DRAWINGS

Specific embodiments of the invention will now be described by way of example only with the use of drawings in which.

DETAILED DESCRIPTION OF A PREFERRED EMBODIMENT

Figure 1:
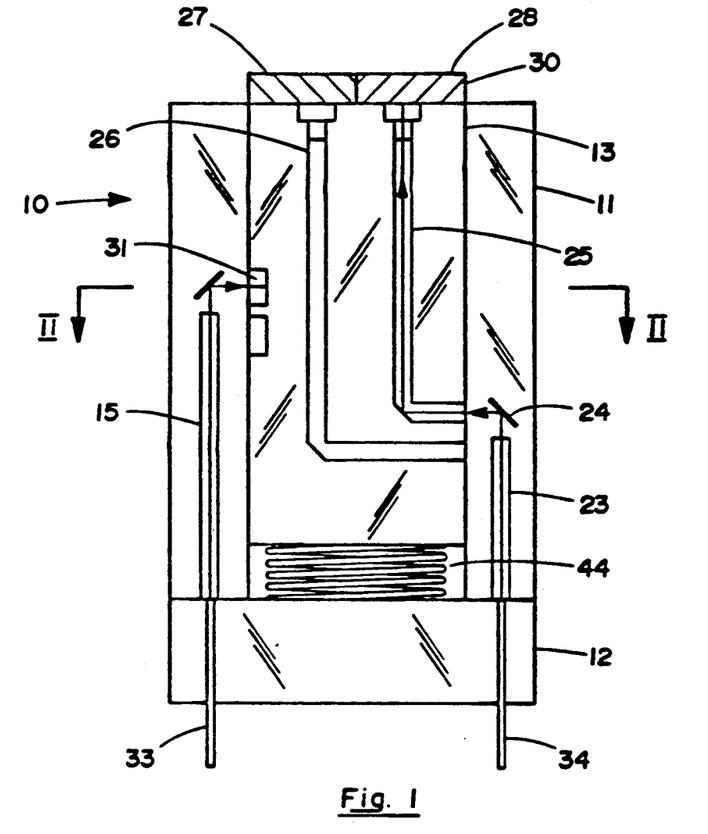
FIG. 1, is a diagrammatic partially sectional side view of a first embodiment of the optical switch according to the invention.
Figure 2:
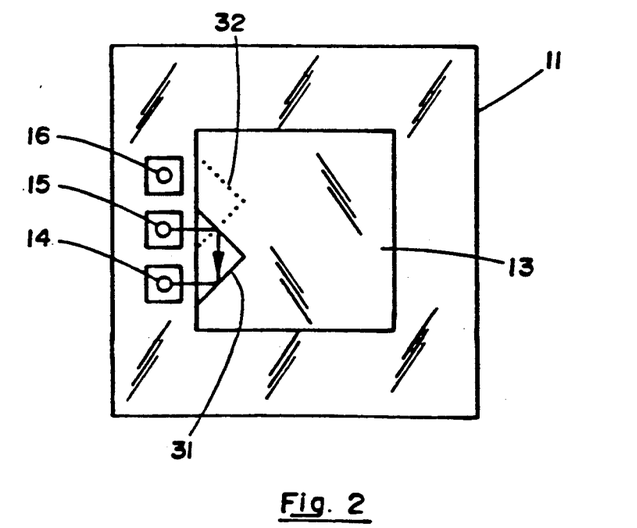
FIG. 2 is a diagrammatic plan sectional view of the switch of FIG. 1 taken along line II—II of FIG. 1.

Referring now to the drawings, an optical switch is illustrated generally at 10 in FIG. 1. It comprises a housing 11a which is made up of a casing 11 mounted on a switch base 12 and a pushbutton 13 mounted within the casing 11 and being operable to move vertically relative to the casing 11. All of the components are plastic and are moulded using injection moulded techniques.

An illumination light is provided through a waveguide 34 mounted in switch base 12.

Figure 5:
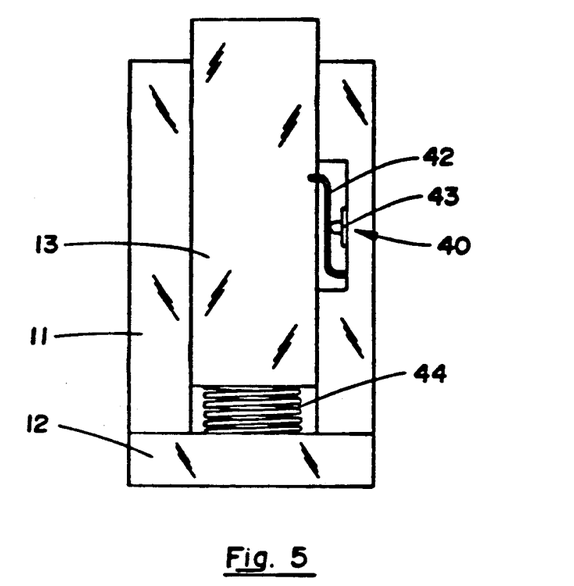
FIG. 5 is a view of the latching mechanism used in the invention.

Referring now to FIG. 5, the latching mechanism generally illustrated at 40. Latching mechanism 40 comprises a latch groove 41 in the form of a heart, a latch 42 and a leaf spring 43 between the casing 11 and the latch 42. A compression spring 44 is positioned between the pushbutton 13 and the switch base 12.

OPERATION

In operation, it will be assumed that the position of the optical switch illustrated in FIG. 1 is the condition under which the circuit is in a positive condition. That is, the circuit is operating.

In this condition, the signal light source which passes through the waveguide 33 and waveguide 15 is reflected off the planar surfaces 31 and is received by waveguide 14. Waveguide 14 is operatively connected to a sensor (not shown), the existence of light indicating to the sensor that the circuit is operating.

Likewise, the illumination light source is transmitted through waveguide 34 to illumination waveguide 23 and is transmitted off mirror 24 to illumination waveguide 25 which extends as indicated to the top of pushbutton 13. The top 30 simply comprises a transparent plastic material, having two sections 27 and 28 with one color, green, indicating that the illumination waveguide 25 is being travelled by light and thereby indicating the the circuit is operational and a second color, red, indicating that the illumination waveguide 24 is being travelled by light and thereby indicating that the circuit is not operational.

Figure 6:
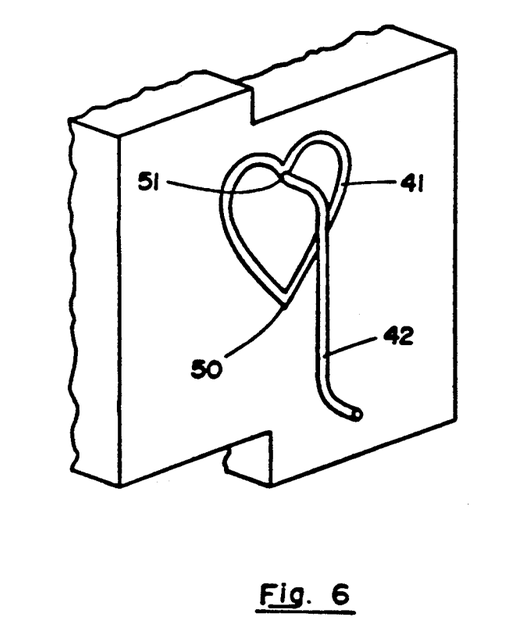
FIG. 6 is an enlarged view o the area VI of FIG. 6.

In this condition, the latch 42 of FIG. 6 will be in the position indicated. That is, it will be positioned in the upper apex of the heart shaped latch groove 41. The compression spring 44 will be compressed as illustrated in FIG. 5.

It will now be assumed that the operator desires to interrupt the operation of the circuit. To do so, he will push downwardly on the pushbutton 13. As he pushes downwardly, the latch groove 41 will move downwardly relative to the latch 42 and the compression spring 44 will be further compressed until the latch 42 is positioned in the upper area of the heart shaped latch groove 41. The pushbutton 13 will then be in the maximum downwards position and it will then be released.

The pushbutton 13 will tend to move upwardly when released under the influence of compression spring 44. As it moves, the latch groove 41 will move upwardly relative to the latch 42 until the latch 42 is received by the bottom apex 50 of the latch groove 41 which will retain the pushbutton 13 in this "up" position.

In this position and again with reference to FIG. 1, the signal light will be transmitted through waveguide 15, reflected off planar surfaces 32 and out through waveguide 16. The signal received by the aforementioned optical sensor from waveguide 14 will cease. A further optical sensor may be positioned to receive the new signal from waveguide 16 if desired, thereby to indicate a new circuit condition.

With the pushbutton in the "up" position as described, the illumination light, rather than being transmitted through waveguide 25, is transmitted to the top 30 of the pushbutton 13 through waveguide 26. The top 27 above the waveguide 26 may be, for example, red plastic transparent material, thus indicating to the operator the condition of the interrupted circuit.

When it is again desired to activate the circuit, the operator will again press the pushbutton 13 until the latch 42 is retained at the uppermost position 51 of the latch groove 41 where it is released. The pushbutton 13 will move upwardly under the influence of compression spring 44 until the position illustrated in FIG. 6 is again assumed by the latch 42 and the latch groove 41.

Figure 3:
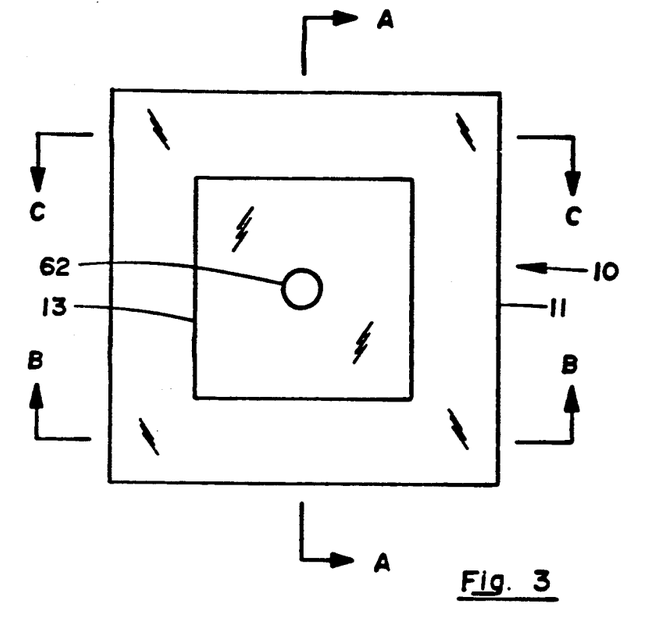
FIG. 3 is a plan view of a second embodiment of the optical switch according to the invention.
Figures 4A, 4B:
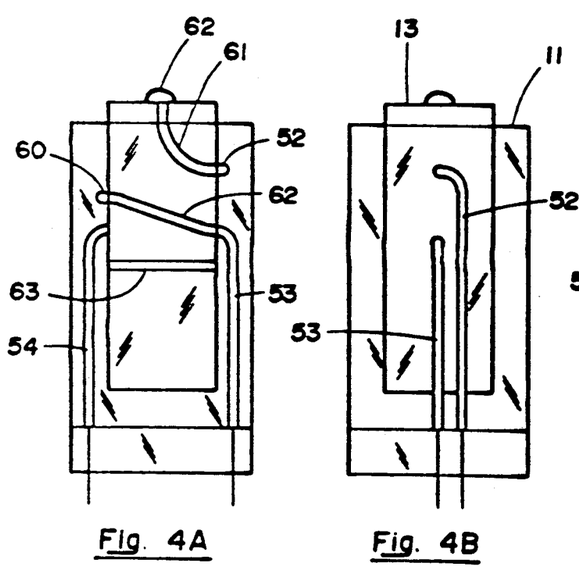
FIGS. 4A, 4B and 4C are diagrammatic sectional view of the switch of FIG. 3 taken along A—A, B—B and C—C, respectively.
Figure 4C:
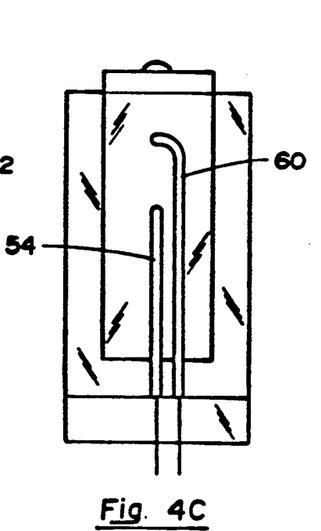

A further embodiment of he invention is illustrated in FIGS. 3 and 4. In this embodiment, the illumination waveguides of FIG. 1 are replaced in favour of fibre optic paths.

Referring to FIG. 4, with the pushbutton in the down position, the input signal is transmitted through a first optical fibre 53 embedded in the casing 11 and, thence, the signal is transmitted through an optical fibre 62 embedded in pushbutton 13 to the output fibre 60. The input illumination signal is transmitted through fibre 52 and fibre 61 in pushbutton 13 where it is transmitted to an indicator 62 on the top of the pushbutton 13.

When the pushbutton assumes an up or operative position, the input signal is transmitted through optical fibre 3 and fibre 63 in the pushbutton 13 where it is transmitted to output fibre 54. The light being transmitted by fibre 52 will not pass the interface with the pushbutton 13 since fibre 61 will no longer be adjacent to fibre 52. Thus, the indicator in top of pushbutton 13 will no longer be illuminated.

Figure 7:
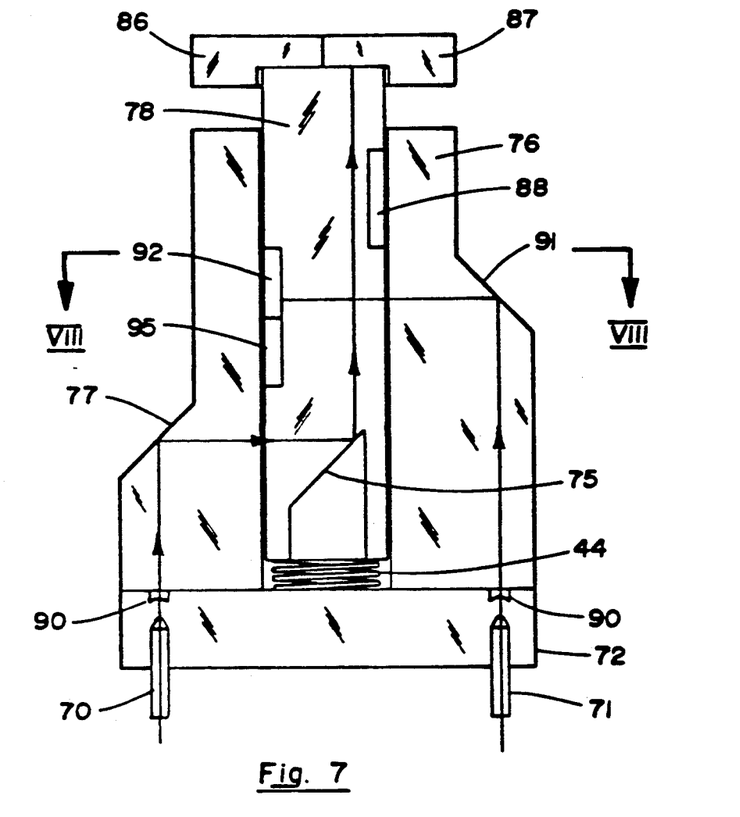
FIG. 7 is a vertical cross-section of a third embodiment of the invention.

FIG. 7 discloses an embodiment of the invention in which the plastic of the casing, plunger and base form the light guide for the system. A plastic base 72 receives the input fibre optic cables 70 and 71. Cable 70 carries the light for the cap indicator illumination, whereas cable 71 carries a signal light beam. The rectangular casing 76, base 72 and plunger 78 are moulded from an optical grade acrylic plastic. The central rectangular plunger 7 is latched by latch 88 as previously described. Cap 80 attached to plunger 78 has transparent coloured indicator sections 86 and 87.

FIG. 7 show the plunger in the "off" position. In this position light entering cable 70 passes through collimating lens 90 and strikes angled shoulder 77 which causes the light beam to be internally reflected for the most part at an angle of 90 degrees. The light beam proceeds into the centre of clear acrylic plunger 78 and strikes surface 75 which causes the beam to be reflected a second time at a 90 degree angle. With the plunger in the lower position the beam strikes the cap 80 at a point in the region of coloured section 87 and accordingly illumination indicating "off" status is perceived by the user.

When the switch is in the "on" position, latch 88 allows the plunger, biassed upwardly by spring 44, to move upwardly, and this causes the surface 75 to be moved upwardly within the casing of the switch. Consequently, the light beam is directed to impinge upon transparent coloured section 86 and the user will see a light indicating "on" status.

Figure 8:
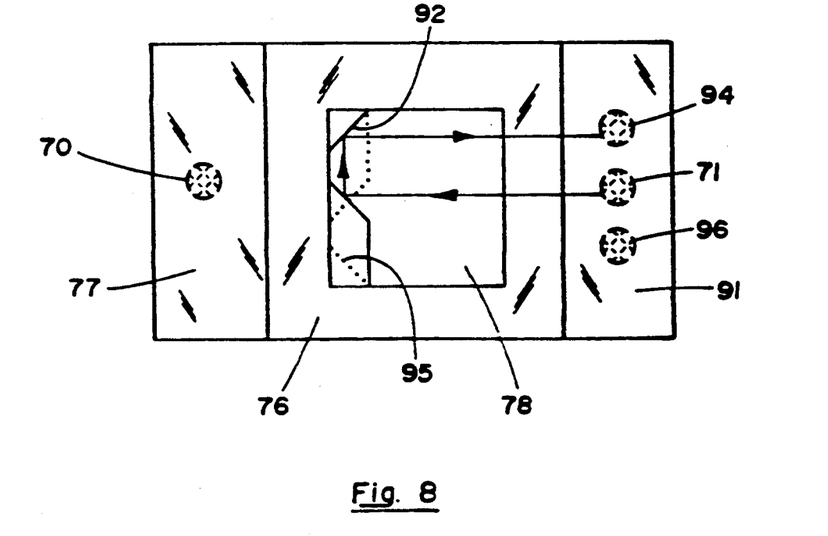
FIG. 8 is a cross-sectional view taken along lines VIII—VIII of FIG. 7.

Similarly the operation of the signal beam can be seen with reference to FIGS. 7 and 8. When the switch is in the "off" position, the light beam travelling along fibre optic cable 71 travels into the casing through a collimating lens 90 which prevents dispersion of the light beam. The beam is then reflected off internal reflecting surface 91 and travels in the path shown in FIG. 8. The beam reflects off internal retro-reflective surfaces 92 so that it returns in a parallel but opposite and offset direction from the incoming beam an travels similarly out of the casing and through output fibre optic cable 9. A light signal carried on this cable indicated to the electrical circuit that the circuit is in the "off" position. When the plunger is released to the "on" position, the plunger moves upwardly in the casing and incoming light beam impinges on the lower reflecting surface 95, shown in dotted outline in FIG. 8, which causes the reflected path of the beam to be directed to output cable 96. A light signal on output cable 96 indicates to the electrical circuit that this circuit is "on".

Collimating lenses 90 are moulded in the casing or base of the switch to prevent dispersion of the light and allow the switch to operate without separate fibre optic cables which would increase the manufacturing cost of the switch. This factor results in significantly decreased manufacturing costs for the present invention. The reflecting surface 25 in the plunger is moulded as an internal reflecting surface in the plunger and needs no mirror surface.

Figure 9:
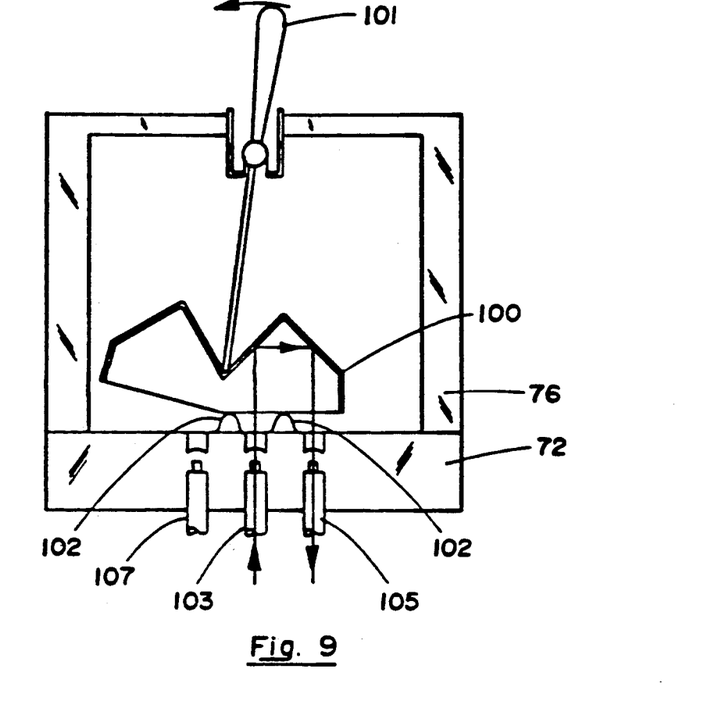
FIG. 9 is a vertical cross-sectional view of a toggle switch actuated embodiment of the invention.

A variant of the invention utilizing a toggle switch actuator is shown in FIG. 9 in which a toggle switch lever 101 connects at its distal end to a prism light guide 100. Input fibre 103 and output fibres 105 and 107 are terminated vertically in a base 72. Detentes 102 are used to locate the light guide 100 in each of two positions. In the first position light from input fibre 103 reflects off of guide 100 into output fibre 105 while in a second position it reflects off of guide 100 into output fibre 107.

Figure 10:
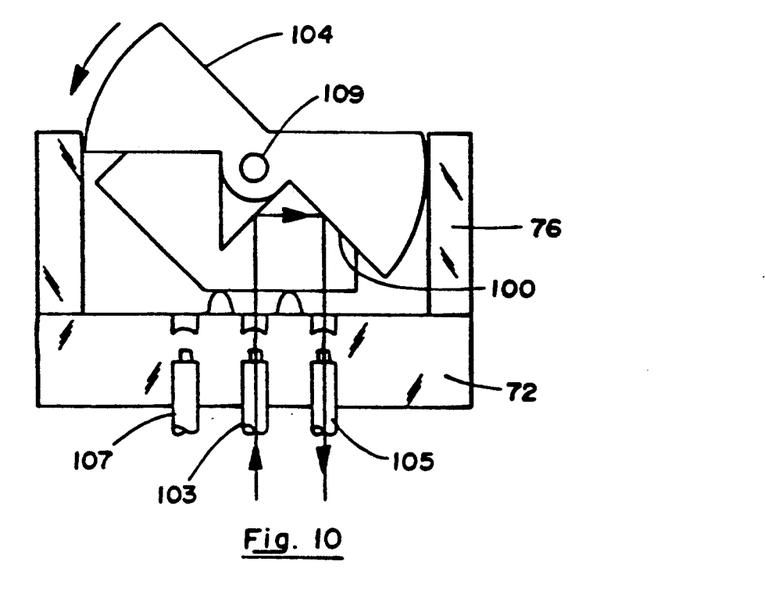
FIG. 10 is vertical cross-sectional view of a rocker switch variant of the invention.

A rocker switch embodiment of the invention is shown in FIG. 10 in which actuator 104 rotates about a pin 109 between each of two positions. A light guide 100 is formed directly on the switch and similar to FIG. 9 reflects light into either fibre 105 or 107 depending on the rocker position.

Figure 11:
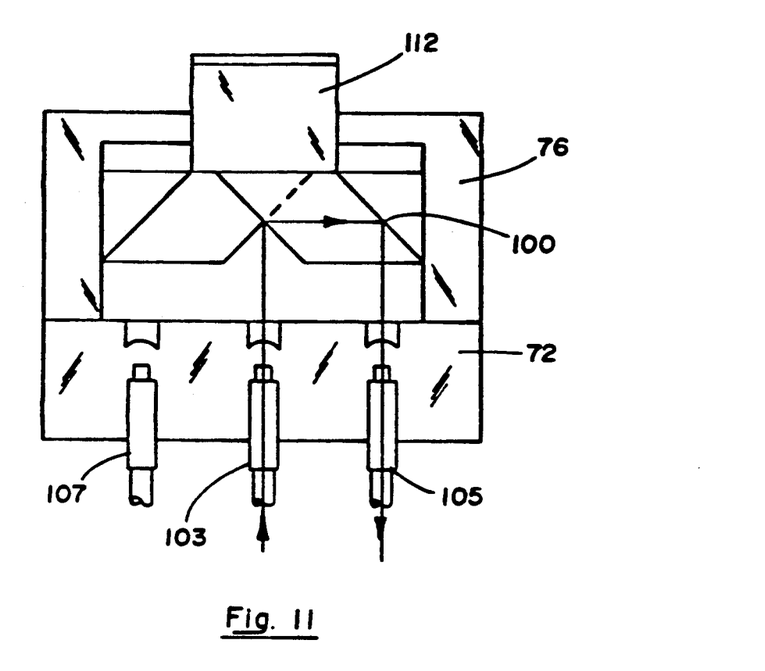
FIG. 11 is a cross-sectional view of a first slide switch variant according to the invention.

A first slide switch variant is shown in FIG. 11 in which a light guide 100 is formed at the bottom of a slide actuator 112 which moves into or out of the paper as shown. The two prism reflectors of guide 100 are offset so that when in a first position light is reflected from input fibre 103 to output fibre 105 while in a second position it is reflected into output fibre 107.

Figure 12:
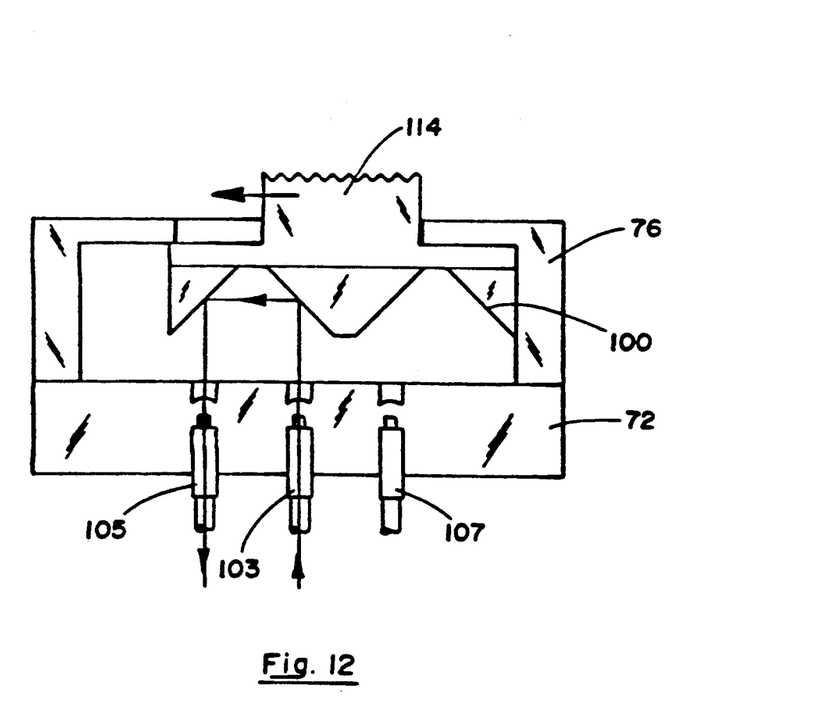
FIG. 12 is a cross-sectional view of a second slide switch variant according to the invention.

A second slide switch variant shown in FIG. 12 is similar to that of FIG. 11 except that the slide moves parallel to the paper so as to bring respective reflecting surfaces of light guide 100 into and out of alignment for reflection of light into output fibres 105 and 107, respectively.

Figure 13:
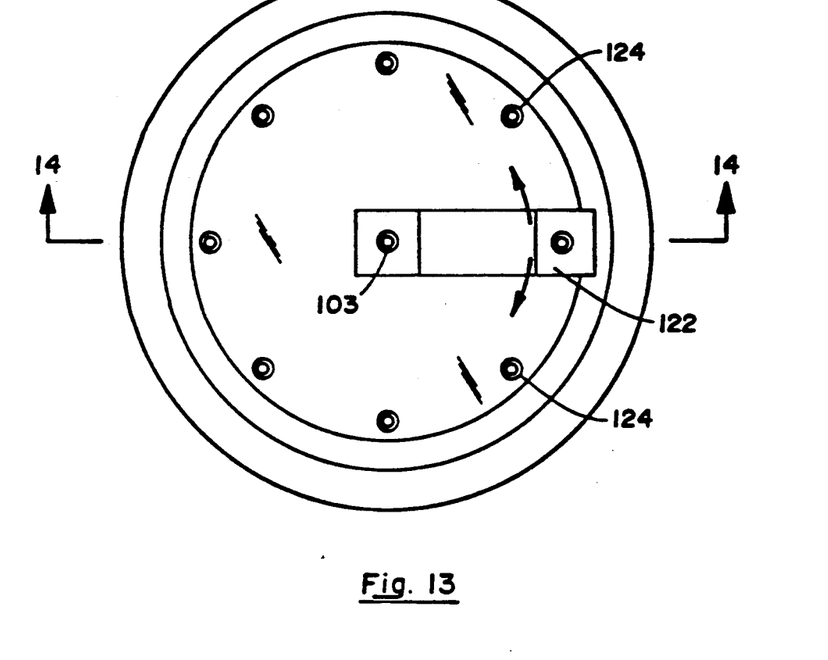
FIG. 13 is a top cross-sectional view of a rotary switch taken along the line 13—13 of FIG. 14 below.
Figure 14:
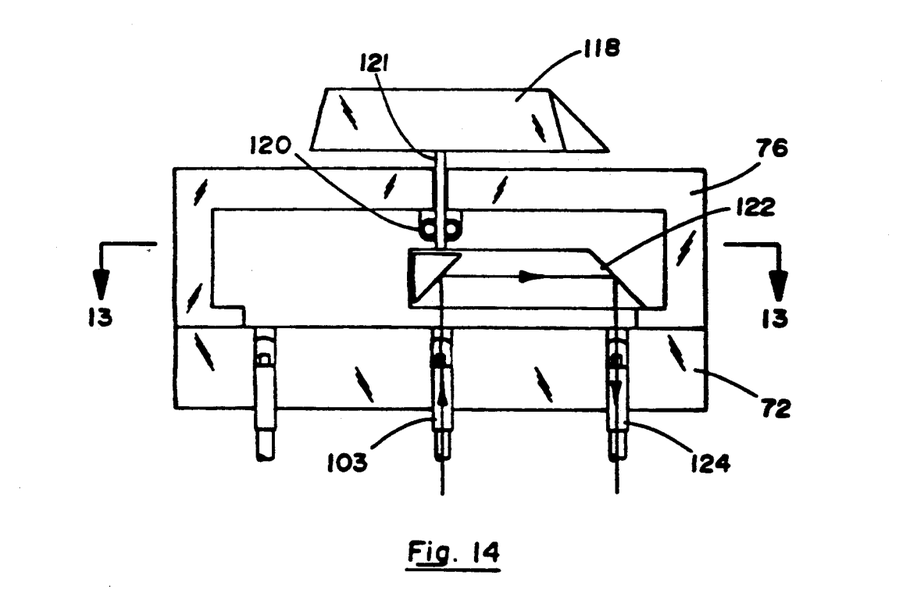
FIG. 14 is a cross-sectional view in elevation taken along the line 14—14 in FIG. 13.

A rotary switch embodiment shown in FIGS. 13 and 14 includes a knob 118 coupled by a shaft 121 located centrally of switch casing 76 to a rotatable prism light guide 122. Multiple detentes 120 located around the shaft 121 locate the light guide 122 at each discrete switch position. At each such position, a plurality of radially spaced apart output fibres 124 are located so as to receive light from input fibre 103 reflected off of prism guide 122.

Due to the geometry of the switch, the manufacturing tolerances for the parts of the switch need not be exact. While the critical tolerances required for operation of the switch are maintained by precise moulding of the optical and mechanical reference surface, the fit between the moving parts need not be precise. This permits simple and inexpensive manufacturing and assembly.

As will be apparent to those skilled in the art, a number of variations of the invention as described in the preferred embodiment are possible without departing from the spirit of the invention. It is possible to substitute coated reflecting surfaces for the internal uncoated surface described. Further, a single input optical fibre may be used both the signal and indicator lights. This would require a beam-splitting surface within the light switch body to generate the two beams. Also, other mechanical equivalents for the reciprocating motion of the plunger will be apparent, such as through use of rotary, rocker, slide, toggle or paddle switches. The scope of the invention is to be construed, however, in accordance with the following claims.

I claim:

1. A switch for switching a beam of light, comprising:
   (a) a housing;
   (b) an actuator reversibly moveable with respect to said housing between a first and second position;
   (c) an input optical path;
   (d) a first output optical path; and
   (e) a light redirecting means for directing light from said input path to said first output path said means including a prism positioned on said actuator and movable to and from a first position in a direction such that reflecting faces of said prism are tangent to the direction of movement of said prism, said prism directing light from said input path to said first output path when said actuator is in said first position.

2. A switch according to claim 1, including a second optical output path and wherein said light redirecting means includes a pair of prisms positioned on said actuator and movable from a first reflecting position to a second reflecting position such that said prisms move in a direction in which their reflecting surfaces are tangent or parallel to the direction of movement, a first output prism of said pair of prisms, when in said first reflecting position, positioned to reflect light from said input path to said first output path and a second output prism of said pair of prisms, when in said second reflecting position, positioned to reflect light from said input path to said second output path.

3. A switch according to claim 1 or 2, wherein reflecting faces of said prism or of each prism of said pair of prisms are orthogonal.

4. A switch according to claim 2, including an input collimating lens positioned so as to collimate light from said input optical path onto said actuator prism and a focusing lens positioned to focus light onto said output light path.

5. A switch for switching a beam of light, comprising:
   (a) a housing;
   (b) an input optical path;
   (c) an actuator reversibly moveable in said housing among a plurality of positions, said actuator having a plurality of prisms movable in response to movement of said actuator so that reflecting faces of said plurality of prisms are tangent or parallel to the direction of movement of said prisms, said prisms directing light from said input path to an output path corresponding to each of said plurality of positions; and
   (d) a plurality of output optical paths each positioned to receive light from said input optical path when said actuator is in a corresponding one of said positions.

6. A switch according to claim 1 or 5, wherein said input and output light paths are optical fibres.

7. A switch according to claim 5, wherein said prism reflecting faces are orthogonal.

8. A switch according to claim 5, including means for biasing said actuator towards each of said plurality of positions.

9. A switch according to claim 5, including a collimating lens positioned so as to collimate light from said input light path onto each of said plurality of prisms and a plurality of focusing lenses each focusing lens positioned to focus light from a corresponding one of said plurality of prisms onto a corresponding one of said optical output light paths.

10. A switch for switching a beam of light, comprising:
   (a) a housing;
   (b) an actuator reversibly moveable with respect to said housing between a first and second position;
   (c) an indicator input optical path;
   (d) a switch input optical path;
   (e) a switch output optical path positioned to receive light from said switch input optical path when said actuator is in said first position and not positioned to receive light when said actuator is in said second position;
   (f) an indicator output optical path positioned to receive light from said indicator input optical path when said actuator is in said first position and not positioned to receive such light when in said second position; and
   (g) an indicator on said actuator responsive to indicate the incidence of light thereon and positioned to receive light from said indicator output optical path;
wherein said indicator becomes illuminated when said switch is in a closed position.

11. A switch according to claim 10, wherein said housing is transparent.

12. A switch according to claim 10, wherein said indicator is translucent.

13. A switch according to claim 10, including a prism on said actuator positioned so that it reflects light from said switch input optical path to said switch output optical path when said actuator is in said first position and is movable in a direction tangent or parallel to reflecting faces of said prism when moving from said first position to said second position.

14. A switch for switching a beam of light, comprising:
   (a) a housing;
   (b) an actuator reversibly moveable with respect to said housing among a plurality of positions;
   (c) an input optical indicator path in said housing;
   (d) a plurality of output optical indicator paths in said actuator positioned to receive light from said input optical path when in respective ones of said plurality of positions; and
   (e) a plurality of indicators on said actuator responsive to indicate the incidence of light thereon and positioned to receive light from respective ones of said output optical indicator paths.

15. A switch according to claim 14, wherein said indicators are translucent.

16. A switch according to claim 14, including a switch input optical path and a plurality of switch output optical paths positioned to receive light from said switch input optical path when said actuator is in said a corresponding one of said plurality of positions, said actuator having a plurality of prisms movable in response to movement of said actuator so that reflecting faces of said plurality of prisms are tangent or parallel to the direction of movement of said prisms, said prisms directing light from said input path to an output path corresponding to each of said plurality of positions.

17. A switch according to claim 16 including a collimating lens positioned so as to collimate light from said input light path onto each of said plurality of prisms and a plurality of focusing lenses each focusing lens positioned to focus light from a corresponding one of said plurality of prisms onto a corresponding one of said optical output light paths.

18. A switch according to claim 14 or 17, wherein said housing is transparent.

19. A switch according to claim 14, wherein said optical paths are optical fibres.

20. A switch according to claim 14, including biasing means for biasing said actuator towards one of said plurality of positions.

21. An optical switch according to claim 10 or 13, wherein said output and input paths are optical fibres.

22. A switch according to claim 13, including a collimating lens positioned to collimate light from said switch input optical path onto said prism and a focusing lens positioned to focus light from said prism onto said switch output optical path.

23. A switch according to claims 13 or 16, wherein said prism reflecting faces are orthogonal.

* * * * *